United States Patent [19]

Iwata et al.

[11] Patent Number: 5,417,948
[45] Date of Patent: May 23, 1995

[54] PROCESS FOR CLEANING HARMFUL GAS

[75] Inventors: Keiichi Iwata; Toshiya Hatakeyama, both of Hiratsuka, Japan

[73] Assignee: Japan Pionics Co., Ltd., Tokyo, Japan

[21] Appl. No.: 144,797

[22] Filed: Oct. 28, 1993

[30] Foreign Application Priority Data

Nov. 9, 1992 [JP] Japan .................................. 4-298806
Dec. 4, 1992 [JP] Japan .................................. 4-325572
Dec. 14, 1992 [JP] Japan .................................. 4-332948
Dec. 14, 1992 [JP] Japan .................................. 4-332949
Dec. 21, 1992 [JP] Japan .................................. 4-355408
Dec. 21, 1992 [JP] Japan .................................. 4-355409

[51] Int. Cl.$^6$ ............................................. B01D 53/54
[52] U.S. Cl. .............................. 423/239.1; 423/240 S; 423/489
[58] Field of Search ................... 423/239.1, 239.2, 489, 423/240 S

[56] References Cited

U.S. PATENT DOCUMENTS

| | | | |
|---|---|---|---|
| 4,339,309 | 7/1982 | Pruett et al. | 423/390 |
| 4,629,611 | 12/1986 | Fan | 423/489 |
| 4,960,581 | 10/1990 | Harada et al. | 423/489 |
| 4,983,373 | 1/1991 | Withers, Jr. et al. | 423/489 |

FOREIGN PATENT DOCUMENTS

| | | |
|---|---|---|
| 0365490 | 4/1990 | European Pat. Off. . |
| 0384802 | 8/1990 | European Pat. Off. . |
| 0431351 | 6/1991 | Germany . |
| 4-122420 | 4/1992 | Japan . |

OTHER PUBLICATIONS

Patent Abstracts of Japan, vol. 16, No. 431, 9 Sep. 1992 of JP-A-04 149 010, 22 May 1992.

*Primary Examiner*—Wayne Langel
*Assistant Examiner*—Stuart L. Hendrickson
*Attorney, Agent, or Firm*—Frishauf, Holtz, Goodman & Woodward

[57] ABSTRACT

There is disclosed a process for cleaning a gas containing a nitrogen fluoride especially nitrogen trifluoride as the harmful component which comprises bringing the gas into contact with a cleaning agent comprising zirconium or a zirconium-based alloy such as Zr-Fe, Zr-Cu, Zr-Ni, Zr-Al, Zr-Mg, Zr-Ca, Zr-Zn, Zr-La and Zr-Ce to remove the harmful component at 100° to 800° C., especially 150° to 500° C. The process is capable of efficiently removing nitrogen fluoride, especially nitrogen trifluoride at a relatively low temperature without generating a harmful byproduct such as nitrogen oxide, and thus exhibits excellent effect on the cleaning of exhaust gas from semiconductor manufacturing process, etc.

9 Claims, No Drawings

PROCESS FOR CLEANING HARMFUL GAS

BACKGROUND OF THE INVENTION

1. Field of the Invention

The present invention relates to a process for cleaning a harmful gas. More particularly, it pertains to a process for cleaning a nitrogen fluoride such as nitrogen trifluoride which is used or generated in the semiconductor manufacturing industry.

With the continuous development of the semiconductor industry, there has been a steady rise in recent years in the amount of nitrogen trifluoride which is used in the dry etching of silicon and silicon oxide, as a gas for cleaning the chamber of a CVD apparatus and the like. Nitrogen trifluoride gas is sparingly soluble in water and rather stable at room temperature with little reactivity with an acid or an alkali, but it is highly toxic and exerts an adverse influence on human bodies and the environment since the maximum permissible concentration thereof in the atmosphere is reported as being 10 ppm. It is therefore, necessary to clean a nitrogen trifluoride-containing gas after being used in a semiconductor production process prior to the discharge in the atmosphere.

In spite of its being stable at ordinary temperature, nitrogen trifluoride generates dinitrogen tetrafluoride, dinitrogen difluoride, dinitrogen hexafluoride, fluorine and the like due to heat, discharge, etc. in etching and cleaning processes, and each of them must be removed as well because of its toxicity is stronger than that of nitrogen trifluoride.

2. Description of the Related Art

As the method of removing a nitrogen fluoride contained in a mixed gas, there have heretofore been proposed (1) a process wherein the gas is brought into contact with metallic silicon at 100° C. or higher (Japanese Patent Application Laid-Open No. 12322/1988), (2) a process wherein the gas is brought into contact with metallic titanium at 200° C. or higher (Japanese Patent Publication No. 48571/1988), (3) a process wherein the gas is brought into contact with Si, B, W, Mo, V, Se, Te, Ge or a non-oxide based compound of any of them at 200° to 800° C. (Japanese Patent Publication No. 48570/1988), (4) a process wherein the gas is brought into contact with a metal halogenide capable of transhalogenation with nitrogen fluoride (Japanese Patent Publication No. 48569/1988), (5) a process wherein the gas is brought into contact with the oxide of a transition metal such as Fe, Mn or Cu at 250° C. or higher (Japanese Patent Application Laid-Open No. 181316/1991), (6) a process wherein the gas is brought into contact with activated carbon at 300° to 600° C. (Japanese Patent Application Laid-Open No. 237929/1987), (7) a process wherein the gas is brought into contact with a composition comprising as principal components Ni, Fe, Co or a noble metal such as Pt, Rh and Pd and at least one from alumina and silica at 200° C. or higher (Japanese Patent Application Laid-Open No. 27303/1987).

Nevertheless, any of the above-proposed processes is insufficient in gas cleaning capability and besides suffers the disadvantage as described hereunder. A volatile fluoride is produced in the processes (1), (2) & (3), a halogen such as chlorine is formed in, the process (4) and a nitrogen oxide is generated in the process (5), each incurring an expense in the treatment of itself. It is necessary in the processes (2) & (3) to heat the reaction system to 300° C. or higher in order that the produced fluoride may not cover the surface of the reaction agent and thus hinder the cleaning reaction. The process (6) involves the danger of explosion due to a violent reaction at an elevated temperature and the problem of byproducing carbon tetrafluoride that is relatively stable and difficult to remove. In the process (7), a harmful gas is not byproduced but a high temperature is required for attaining sufficient cleaning capability and in the case of nickel (Ni), for example, for the purpose of achieving practical performance, the reaction system needs to be heated to 400° C. or higher, that is, much higher than 200° C. at which the decomposition activity is insufficient and besides, the surface of the reaction agent is covered with the fluoride with the progress of the reaction, thereby failing to assure sufficient cleaning capability.

SUMMARY OF THE INVENTION

Under such circumstances, intensive research and investigation were continued by the present inventors on the development of a process for cleaning nitrogen fluoride with high treatment capacity at a low temperature without producing a harmful gas or a gas having a possibility of causing environmental pollution while solving the disadvantages of the conventional techniques. As a result, it has been found by the present inventors that the nitrogen fluorides can be removed in extremely high efficiency at a relatively low temperature without generating a substance adversely affecting the environment in the exhaust gas after a cleaning treatment by using zirconium or a zirconium-based alloy as the cleaning agent. The present invention has been accomplished on the basis of the above-mentioned finding.

Specifically the present invention provides a process for cleaning a gas containing a nitrogen fluoride as the harmful component which comprises bringing said gas under heating into contact with a cleaning agent comprising zirconium to remove said harmful component and a process for cleaning a gas containing a nitrogen fluoride as the harmful component which comprises bringing said gas under heating into contact with a cleaning agent comprising a zirconium-based alloy to remove said harmful component.

According to the present invention, the nitrogen fluorides including nitrogen trifluoride which is contained in the air, nitrogen, argon and hydrogen and other nitrogen fluoride such as dinitrogen tetrafluoride, dinitrogen difloride, dinitrogen hexafloride can efficiently be removed.

DESCRIPTION OF PREFERRED EMBODIMENTS

As the cleaning agent according to the present invention, there is employed zirconium or a zirconium-based alloy. As the zirconium source applicable to the preparation of the cleaning agent according to the present invention, mention may be made of metallic zirconium and sponge zirconium each available on the market, which can be used as such or by crushing them into an appropriate size. The zirconium available on the market sometimes contains hafnium in an amount of about 1 to 5% by weight, but such extent of hafnium content does not exert evil influence on the cleaning capability and is not liable to produce a harmful substance such as a volatile fluoride or nitrogen oxide in the course of cleaning reaction.

The zirconium-based alloy as mentioned above is usually the alloy of zirconium and at least one metallic element selected from the group consisting of iron, copper, nickel, aluminum, magnesium, calcium, zinc, lanthanum, cerium, vanadium, molybdenum, titanium, chromium, tungsten, tantalum, cadmium, yttrium, niobium and tin. The preferable alloy among them includes that of zirconium and at least one element selected from iron, copper, nickel, aluminum, magnesium, calcium, zinc, lanthanum and cerium, since it does not generate a volatile fluoride during,the course of reaction with a nitrogen fluoride and is easily available at a relatively low cost.

The nitrogen-fluoride removing function in the present invention is attributable principally to the zirconium component, which function is corroborated by the fact that the powdery substance formed during the cleaning operation as the reaction product of the cleaning agent and a nitrogen fluoride is proved to be mainly zirconium fluoride by the analysis of the substance. Accordingly, the cleaning agent consisting of zirconium as simple substance is characterized by its high cleaning capacity.

In addition, the cleaning capacity per unit weight of the cleaning agent consisting of a zirconium-containing alloy increases with an increase in the content of zirconium in the alloy. However, the alloying metallic component other than zirconium exhibits the effect on lowering the temperature at which a nitrogen fluoride is removed, and such effect is remarkably enhanced by an appropriate content of said component in the alloy. In more detail, the zirconium as simple substance necessitates a temperature of about 300° C. for the purpose of attaining practical cleaning capability, whereas the zirconium-containing alloy enables a gas containing a nitrogen fluoride in the same concentration to be treated at a temperature lower than 300° C. at the same flow rate. For example, practical cleaning capability is achieved at a lower temperature of 170° to 250° C. by appropriately selecting the content the alloying metal other than zirconium at 40% or less by weight.

The content of zirconium in the cleaning agent according to the present invention is not specifically limited, but in the case of zirconium-containing alloy, it is usually 20% or more, desirably 50% or more, more desirably 60% or more by weight with the above-mentioned metallic element as the balance. A content thereof less than 20% by weight results in insufficient capacity of removing nitrogen fluoride and decrease in the effect on lowering the cleaning temperature by alloying and besides causes a fear of byproducing a volatile fluoride depending upon the cleaning conditions.

The zirconium-based alloy can be produced by blending zirconium and the above-mentioned at least one metallic element at a prescribed blending ratio and subsequently alloying the resultant blend through electron beam melting, argon arc melting, high frequency heating melting or resistance heating melting each under vacuum or in an atmosphere of an inert gas or the like method of melting. The alloy thus produced is crushed to 6 to 20 mesh by mechanical crushing by means of a ball mill, jaw crusher, roll mill or the like to be employed as the cleaning agent. Alternatively, it is pulverized to about 100 mesh fine powder, which is made into granules or granulated powder having a size about 1 to 5 mm or molded into pellets to be employed as the cleaning agent. Various zirconium-based alloys available on the market may be employed as it is or after crushing to a suitable size.

The cleaning agent comprising zirconium or the zirconium-based alloy according to the present invention can be used as any of fixed bed, moving bed and fluidized bed. Under ordinary circumstances, the cleaning agent is packed in a cleaning column, and the gas containing a nitrogen fluoride is passed therethrough while being brought into contact with the cleaning agent so that the nitrogen fluoride as the harmful component is removed so as to clean the gas.

The temperature at which the gas to be treated is brought into contact with the cleaning agent (cleaning temperature) is usually 100° to 800° C., desirably 150° to 500° C., more desirably 200° to 350° C. in case of zirconium, and 150° to 300° C. in case of a Zirconium -based alloy. A temperature lower than 100° C. results in deterioration of the capability of removing nitrogen fluoride, whereas that high than 800° C. brings about the disadvantages that stainless steel can not be used for the cleaning column, thereby lowering safety and besides increasing heating energy loss.

In the case where an atmospheric component is mixed in the gas to be treated, a high cleaning temperature is liable to cause heat release due to the reaction of the cleaning agent with oxygen and therefore, the cleaning operation is put into practice preferably at 250° C. or lower.

The pressure during the cleaning operation is usually atmospheric pressure, but can be reduced pressure or raised pressure such as 1 kg/cm² G.

There is no limitation to the flow velocity of the gas to be treated to which the cleaning process according to the present invention is applied, but in general the flow velocity is desirably lowered with increase in the concentration of the nitrogen fluoride contained in the gas to be treated.

The cleaning column is designed in accordance with the concentration of the nitrogen fluoride as the harmful gas, the amount and flow rate of the gas to be treated, etc. The space linear velocity (LV) in the column is preferably designed at 20 cm/sec or lower for a relatively low concentration of nitrogen fluoride such as 1000 ppm or less and at 5 cm/sec or lower for the concentration higher than 1000 ppm.

The length of the packed cleaning agent in the cleaning column varies depending on the flow rate of the gas to be treated, the concentration of the harmful gas and the like and can not be unequivocally specified, but is usually 50 to 500 mm, approximately from the practical viewpoint. In general, the length thereof is determined in accordance with the pressure loss through the packed bed, contact efficiency of the gas with the cleaning agent:, the concentration of the harmful gas and the like.

As mentioned hereinbefore, thereaction during the cleaning operation according to the present invention causes zirconium fluoride to be formed in the form of powder, which is discharged outside the system along with the treated gas or dropped to the bottom of the cleaning column, or allowed to remain in part in the packed zone of the cleaning agent depending on the operational conditions, whereby the pressure loss through the zone is unfavorably increased. Such increase in the pressure loss can be prevented by imparting vibration to the column continuously or intermittently by means of a vibrator or the like fixed to the column to drop the powder down to the bottom of the column. When necessary, a filter for collecting the powder in the treated gas may be installed on the downstream side of the cleaning column.

In summary, according to the process for cleaning a harmful gas of the present invention, nitrogen fluoride such as nitrogen trifluoride contained in a gas can efficiently be removed at a relatively low temperature without producing a harmful byproduct such as a nitrogen oxide. The process, therefore, exhibits an excellent effect on the cleaning of exhaust gas from a semiconductor manufacturing process or the like.

In the following the present invention will be described in more detail with reference to the non-limitative examples and comparative examples.

EXAMPLE 1

84.9 ml of sponge zirconium that was procured from the market (prepared by screening crushed product to 6 to 32 mesh, with 99.5% purity) was packed in a quartz-made cleaning column having 19 mm inside diameter and 400 mm length. Then, helium (He) gas containing 1% nitrogen trifluoride ($NF_3$) was passed through the column at a total flow rate of 170 ml/min, that is, a space linear velocity (LV) of 1 cm/sec at 250° C. under atmospheric pressure, and the column outlet gas was analyzed for $NF_3$ by gas chromatography (lower limit of detectable range being 10 ppm). As a result, $NF_3$ was not detected. Subsequently, the gas was passed through the column for further 3 hours'. As a result, there was not observed break through nor the formation of harmful byproduct such as $NO_x$.

EXAMPLE 2

28.3 ml of the sponge zirconium same as that used in Example 1 was packed in a quartz-made cleaning column having 19 mm inside diameter and 400 mm length. Then, He gas containing 1% $NF_3$ was passed through the column at a total flow rate of 85 ml/min, that is, a space linear velocity (LV) of 0.5 cm/sec at room temperature under atmospheric pressure, and after 20 minutes the column outlet gas was analyzed to determine $NF_3$ concentration by gas chromatography (lower limit of detectable range being 10 ppm). Subsequently, the gas temperature was raised by increments of 50° C., while the temperature was maintained for 10 minutes at every increment to determine $NF_3$ concentration in the column outlet gas by gas chromatography and thereby obtain $NF_3$ decomposition efficiency at each incremental temperature. By plotting the decomposition efficiency thus obtained against the temperature, the lower limit of the temperature at which the $NF_3$ decomposition efficiency exceeded 90% was obtained by means of interpolation. The result was 280° C.

Thereafter, 8.5 ml of the same sponge zirconium as the cleaning agent was further packed in the column. Subsequently He gas was passed through the column at a total flow rate of 500 ml/min, while the gas temperature was raised to 300° C. Thereafter, He gas containing 2% $NF_3$ was passed through the column at a total flow rate of 509 ml/min, that is, a LV of 3 cm/sec at 300° C. under atmospheric pressure, while the outlet gas was monitored by means of an $NF_3$ detector available on the market (TG-4100 TA, produced by Bionics Instruments Co., Ltd.) to determine the break through time by regarding the point at which $NF_3$ concentration in the outlet gas reached 10 ppm as the break through point.

The cleaning capability (throughput of $NF_3$ (L) per 1L of Zr) was obtained by calculation from the result thus obtained. The result was 711L/L. In addition in order to check byproduct formation, nitrogen monoxide (NO) and nitrogen dioxide ($NO_2$) in the exhaust gas were measured prior to the break through by means of the detecting tubes (for separating and analyzing nitrogen oxides, lower limit of detectable range being 1 ppm for NO and 0.5 ppm for $NO_2$, produced by Gastech Corp.). As a result, nitrogen oxide was not detected.

EXAMPLE 3

28.3 ml of cleaning agent comprising Zr-Fe alloy procured from the market (80% by weight of Zr with the balance Fe) which had been crushed and screened to 10 to 32 mesh was packed in a quartz-made cleaning column having 19 mm inside diameter and 400 mm length. Then He gas containing 1% $NF_3$ was passed through the column at a total flow rate of 85 ml/min, that is, a space linear velocity (LV) of 0.5 cm/sec at room temperature under atmospheric pressure, and after 20 minutes the column outlet gas was analyzed to determine $NF_3$ concentration by gas chromatography (lower limit of detectable range being 10 ppm). Subsequently, the gas temperature was raised by increments of 50° C., while the temperature was maintained for 10 minutes at every increment to determine $NF_3$ concentration in the column outlet gas by gas chromatography and thereby obtain $NF_3$ decomposition efficiency at each incremental temperature. By plotting the decomposition efficiency thus obtained against the temperature, the lower limit of the temperature at which the $NF_3$ decomposition efficiency exceeded 90% was obtained by means of interpolation. The result is given in Table 1.

Thereafter, 8.5 mol of the same alloy as the cleaning agent was further packed in the column. Subsequently He gas was passed through the column at a total flow rate of 500 ml/min, while the gas temperature was raised to 200° C. Thereafter, He gas containing 2% $NF_3$ was passed through the column at a total flow rate of 509 ml/min, that is, a LV of 3 cm/sec under atmospheric pressure, while the outlet gas was monitored by means of an $NF_3$ detector available on the market (TG-4100 TA, produced by Bionics Instruments Co., Ltd.) to determine the break through time by regarding the point at which $NF_3$ concentration in the outlet gas reached 10 ppm as the break through point.

The cleaning capability (throughput of $NF_3$ (L) per 1L of Zr-alloy) was obtained by calculation from the result thus obtained. In addition in order to check byproduct formation, nitrogen monoxide (NO) and nitrogen dioxide ($NO_2$) in the exhaust gas were measured prior to the break through by means of the detecting tubes (for separating and analyzing nitrogen oxides, lower limit of detectable range being 1 ppm for NO and 0.5 ppm for $NO_2$, produced by Gastech Corp.). The results are given in Table 2.

EXAMPLE 4 TO 6

Sponge zirconium and reduced iron each procured from the market in a total amount of about 500 g were blended in different compositions (90%, 50% or 40% by weight of Zr and the balance iron) and then melted by electron beam twice repeatedly to afford Zr-Fe alloys, which were crushed in a ball mill and screened to 14 to 20 mesh to prepare various alloys each having a different composition from one another.

Subsequently, the procedure in Example 3 was repeated to carry out cleaning experiment except that each of the above-prepared alloys was used as the cleaning agent and the cleaning temperature was altered, respectively. The results are given in Table 1 and Table 2.

COMPARATIVE EXAMPLE 1

The procedure in Example 3 was repeated to carry out cleaning experiment except that there was used as the cleaning agent iron wires procured from the market and cut into a length of 5 to 10 mm. The results are given in table 1 and Table 2.

TABLE 1

|  | Alloy composition (wt %) | | Lower limit of temperature (°C.) attaining ≧90% decomposition efficiency |
|---|---|---|---|
|  | Fe | Zr |  |
| Example 3 | 20 | 80 | 195 |
| Example 4 | 10 | 90 | 195 |
| Example 5 | 50 | 50 | 245 |
| Example 6 | 60 | 40 | 250 |
| Comparative Example 1 | 100 | 0 | 325 |

TABLE 2

|  | Cleaning temperature (°C.) | Cleaning capability (L/L) | Nitrogen oxide |
|---|---|---|---|
| Example 3 | 200 | 594 | ND |
| Example 4 | 200 | >100 | ND |
| Example 5 | 250 | >100 | ND |
| Example 6 | 280 | >100 | ND |
| Comparative Example 1 | 300 | 3 | ND |
|  | 400 | 7 | ND |

EXAMPLES 7 TO 15

Sponge zirconium and copper or silver each procured from the market in a total amount of about 500 g were blended in different compositions (40%, 50%, 75% or 90% by weight of Zr and the balance copper or silver) and then melted by an electron beam twice repeatedly to afford Zr-Cu or Zr-Ag alloys, which were crushed in a ball mill and screened to 14 to 20 mesh to prepare various alloys each having a different composition. Then, 28.3 ml of each of the alloys was packed in a quartz-made cleaning column having 19 mm inside diameter and 400 mm length. Then, helium (He) gas containing 1% $NF_3$ was passed through the column at a total flow rate of 85 ml/min, that is, a space linear velocity (LV) of 0.5 cm/sec at room temperature under atmospheric pressure, and after 20 minutes the column outlet gas was analyzed to determine $NF_3$ concentration by gas chromatography (lower limit of detectable range being 10 ppm). Subsequently, the gas temperature was raised by increments of 100° C., while the temperature was maintained for 10 minutes at every increment to determine $NF_3$ concentration in the column outlet gas by gas chromatography and thereby obtain $NF_3$ decomposition efficiency at each incremental temperature. By plotting the decomposition efficiency thus obtained against the temperature, the lower limit of the temperature at which the $NF_3$ decomposition efficiency exceeded 90% was obtained by means of interpolation. The result is given in Table 3.

Thereafter, 8.5 ml of each of the alloys as the cleaning agent was further packed in a column. Subsequently He gas was passed through the column at a total flow rate of 500 ml/min, while the gas temperature was raised to the temperature as shown in Table 2. Thereafter, He gas containing 2% $NF_3$ was passed through the column at a total flow rate of 509 ml/min, that is, a LV of 3 cm/sec under atmospheric pressure, while the outlet gas was monitored by means of an $NF_3$ detector available on the market (TG-4100 TA, produced by Bionics Instruments Co., Ltd.) to determine the break through time by regarding the point at which $NF_3$ concentration in the outlet gas reached 10 ppm as the break through point.

The cleaning capability (throughput of $NF_3$ (L) per 1L of Zr-alloy) was obtained by calculation from the result thus obtained. In addition in order to check by-product formation, nitrogen monoxide (NO) and nitrogen dioxide ($NO_2$) in the exhaust gas were measured prior to the break through by means of the detecting tubes (for separating and analyzing nitrogen oxides, lower limit of detectable range being 1 ppm for NO and 0.5 ppm for $NO_2$, produced by Gastech Corp.). The result are given in Table 4.

COMPARATIVE EXAMPLES 2 TO 3

The procedure in Example 3 was repeated to carry out cleaning experiment except that there were used as the copper source, copper wires procured from the market and cut into a length of 5 to 10 mm. The results are given in Table 3 and Table 4.

TABLE 3

|  | Alloy composition (wt %) | | | Lower limit of temperature (°C.) attaining ≧90% decomposition efficiency |
|---|---|---|---|---|
|  | Zr | Cu | Ag |  |
| Example 7 | 40 | 60 | 0 | 235 |
| Example 8 | 50 | 50 | 0 | 235 |
| Example 9 | 75 | 25 | 0 | 220 |
| Example 10 | 90 | 10 | 0 | 225 |
| Example 11 | 40 | 0 | 60 | 260 |
| Example 12 | 50 | 0 | 50 | 255 |
| Example 13 | 75 | 0 | 25 | 235 |
| Example 14 | 90 | 0 | 10 | 250 |
| Example 15 | 75 | 15 | 10 | 225 |
| Comparative Example 2 | 0 | 100 | 0 | 335 |
| Comparative Example 3 | 0 | 0 | 100 | 430 |

TABLE 4

|  | Cleaning temperature (°C.) | Cleaning capability (L/L) | Nitrogen oxide |
|---|---|---|---|
| Example 7 | 280 | >100 | ND |
| Example 8 | 250 | >100 | ND |
| Example 9 | 230 | 568 | ND |
| Example 10 | 230 | >100 | ND |
| Example 11 | 280 | >100 | ND |
| Example 12 | 280 | >100 | ND |
| Example 13 | 250 | >100 | ND |
| Example 14 | 260 | >100 | ND |
| Example 15 | 250 | >100 | ND |
| Comparative Example 2 | 350 | 19 | ND |
| Comparative Example 3 | 500 | 8 | ND |

EXAMPLES 16 TO 29

Sponge zirconium and nickel, cobalt or manganese each procured from the market in a total amount of about 500 g were blended in different compositions (40%, 50%, 75% or 90% by weight of Zr and the balance Ni, Co or Mn) and then melted by an electron beam twice repeatedly to afford Zr-Ni, Zr-Co or Zr-Mn alloys, which were crushed in a ball mill and screened to 14 to 20 mesh to prepare various alloys as cleaning agent each having a different composition from one another. Then 28.3 ml of each of the alloys was packed in a quartz-made cleaning column having 19 mm inside diameter and 400 mm length. Each of the Zr-alloys as the cleaning agent was tested in the same manner as in Example 7 to determine the temperature attaining 90% decomposition efficiency, cleaning capability and nitrogen oxide concentration. The results are given in Table 5.

COMPARATIVE EXAMPLES 4 TO 6

The procedure in Example 16 was repeated to carry out cleaning experiment except that there was used as the cleaning agent, Ni, Co or Mn procured from the market and screened to 6 to 32 mesh. The results are given in Table 5 and Table 6.

TABLE 5

| | Alloy composition (wt %) | | | | Lower limit of temperature (°C.) attaining ≧90% decomposition efficiency |
|---|---|---|---|---|---|
| | Zr | Ni | Co | Mn | |
| Example 16 | 40 | 60 | 0 | 0 | 240 |
| Example 17 | 50 | 50 | 0 | 0 | 220 |
| Example 18 | 75 | 25 | 0 | 0 | 205 |
| Example 19 | 90 | 10 | 0 | 0 | 205 |
| Example 20 | 40 | 0 | 60 | 0 | 260 |
| Example 21 | 50 | 0 | 50 | 0 | 240 |
| Example 22 | 75 | 0 | 25 | 0 | 225 |
| Example 23 | 90 | 0 | 10 | 0 | 225 |
| Example 24 | 40 | 0 | 0 | 60 | 265 |
| Example 25 | 50 | 0 | 0 | 50 | 245 |
| Example 26 | 75 | 0 | 0 | 25 | 245 |
| Example 27 | 90 | 0 | 0 | 10 | 240 |
| Example 28 | 75 | 15 | 10 | 0 | 210 |
| Example 29 | 90 | 5 | 0 | 5 | 215 |
| Comparative Example 4 | 0 | 100 | 0 | 0 | 290 |
| Comparative Example 5 | 0 | 0 | 100 | 0 | 315 |
| Comparative Example 6 | 0 | 0 | 0 | 100 | 340 |

TABLE 6

| | Cleaning temperature (°C.) | Cleaning capability (L/L) | Nitrogen oxide |
|---|---|---|---|
| Example 16 | 280 | >100 | ND |
| Example 17 | 250 | >100 | ND |
| Example 18 | 210 | 504 | ND |
| Example 19 | 210 | >100 | ND |
| Example 20 | 280 | >100 | ND |
| Example 21 | 250 | >100 | ND |
| Example 22 | 240 | >100 | ND |
| Example 23 | 240 | >100 | ND |
| Example 24 | 280 | >100 | ND |
| Example 25 | 280 | >100 | ND |
| Example 26 | 250 | >100 | ND |
| Example 27 | 250 | >100 | ND |
| Example 28 | 210 | >100 | ND |
| Example 29 | 215 | >100 | ND |
| Comparative Example 4 | 300 | 17 | ND |
| Comparative Example 5 | 330 | 10 | ND |
| Comparative Example 6 | 350 | 11 | ND |

EXAMPLES 30 TO 51

Sponge zirconium and magnesium, calcium, zinc, aluminum, lanthanum or cerium each procured from the market in a total amount of about 500g were blended in different compositions (40%, 50%, 75% or 90% by weight of Zr and the balance Mg, Ca, Zn, Al, La or Ce) and then melted by an electron beam twice repeatedly to afford Zr-Mg, Zr-Ca, Zr-Zn, Zr-Al or Zr-Ce alloys, which were crushed in a ball mill and screened to 14 to 20 mesh to prepare various alloys as cleaning agent each having a different composition from one another. Each of the cleaning agents was tested in the same manner as in Example 7 to determine the temperature attaining 90% decomposition efficiency, cleaning capability and nitrogen oxide concentration. The results are given in Table 7 and Table 8.

COMPARATIVE EXAMPLES 7 TO 11

The procedure in Example 30 was repeated to carry out cleaning experiment except that there was used as the cleaning agent, sand magnesium, granular calcium, granular zinc (1 to 2 mm size), granular aluminum (2 to 3 mm size) or granular cerium (1 to 2 mm size). The results are given in Table 7 and Table 8.

TABLE 7

| | Alloy composition (wt %) | | Lower limit of temperature (°C.) attaining ≧90% decomposition efficiency |
|---|---|---|---|
| | Zr | other metal | |
| Example 30 | 40 | Mg 60 | 225 |
| Example 31 | 50 | Mg 50 | 225 |
| Example 32 | 75 | Mg 25 | 190 |
| Example 33 | 90 | Mg 10 | 195 |
| Example 34 | 40 | Ca 60 | 230 |
| Example 35 | 50 | Ca 50 | 230 |
| Example 36 | 75 | Ca 25 | 200 |
| Example 37 | 90 | Ca 10 | 210 |
| Example 38 | 40 | Zn 60 | 245 |
| Example 39 | 50 | Zn 50 | 215 |
| Example 40 | 75 | Zn 25 | 205 |
| Example 41 | 90 | Zn 10 | 200 |
| Example 42 | 40 | Al 60 | 240 |
| Example 43 | 50 | Al 50 | 240 |
| Example 44 | 75 | Al 25 | 215 |
| Example 45 | 90 | Al 10 | 210 |
| Example 46 | 40 | La 60 | 245 |
| Example 47 | 50 | La 50 | 240 |
| Example 48 | 75 | La 25 | 230 |
| Example 49 | 90 | La 10 | 240 |
| Example 50 | 40 | Ce 60 | 235 |
| Example 51 | 50 | Ce 50 | 245 |
| Example 52 | 75 | Ce 25 | 215 |
| Example 53 | 90 | Ce 10 | 225 |
| Example 54 | 75 | Mg 15 Al 10 | 195 |
| Example 55 | 90 | Mg 5 Zn 5 | 195 |
| Comparative Example 7 | 0 | Mg 100 | 270 |
| Comparative Example 8 | 0 | Ca 100 | 280 |
| Comparative Example 9 | 0 | Zn 100 | 340 |
| Comparative Example 10 | 0 | Al 100 | 465 |
| Comparative Example 11 | 0 | La 100 | 320 |
| Comparative Example 12 | 0 | Ce 100 | 310 |

TABLE 8

| | Cleaning temperature (°C.) | Cleaning capability (L/L) | Nitrogen oxide |
|---|---|---|---|
| Example 30 | 250 | >100 | ND |
| Example 31 | 250 | >100 | ND |
| Example 32 | 200 | 404 | ND |
| Example 33 | 200 | >100 | ND |
| Example 34 | 250 | >100 | ND |
| Example 35 | 250 | >100 | ND |
| Example 36 | 210 | 389 | ND |
| Example 37 | 220 | >100 | ND |
| Example 38 | 280 | >100 | ND |
| Example 39 | 250 | >100 | ND |

TABLE 8-continued

| | Cleaning temperature (°C.) | Cleaning capability (L/L) | Nitrogen oxide |
|---|---|---|---|
| Example 40 | 230 | 381 | ND |
| Example 41 | 230 | >100 | ND |
| Example 42 | 280 | >100 | ND |
| Example 43 | 250 | >100 | ND |
| Example 44 | 230 | 495 | ND |
| Example 45 | 230 | >100 | ND |
| Example 46 | 260 | >100 | ND |
| Example 47 | 260 | >100 | ND |
| Example 48 | 250 | 406 | ND |
| Example 49 | 260 | >100 | ND |
| Example 50 | 250 | >100 | ND |
| Example 51 | 250 | >100 | ND |
| Example 52 | 230 | >100 | ND |
| Example 53 | 230 | >100 | ND |
| Example 54 | 210 | >100 | ND |
| Example 55 | 210 | >100 | ND |
| Comparative Example 7 | 300 | 16 | ND |
| Comparative Example 8 | 300 | 11 | ND |
| Comparative Example 9 | 400 | 25 | ND |
| Comparative Example 10 | 500 | 9 | ND |
| Comparative Example 11 | 350 | 12 | ND |
| Comparative Example 12 | 350 | 19 | ND |

EXAMPLES 56 TO 88

Sponge zirconium and vanadium, molybdenum, titanium, chromium, tungsten, tantalum, niobium or tin each procured from the market in a total amount of about 500 g were blended in different compositions (40%, 50%, 70% or 90% by weight of Zr and the balance V, Mo, Ti, Cr, W, Ta or Nb or 50%, 70% or 90% by weight of Zr and the balance Sn)O and then melted by electron beam twice repeatedly to afford Zr-V, Zr-Mo, Zr-Ti, Zr-Cr, Zr-W, Zr-Ta, Zr-Nb or Zr-Sn alloys, which were crushed in a ball mill and screened to 14 to 20 mesh to prepare various alloys as cleaning agent each having a different composition from one another. Then 28.3 ml of each of the alloys was packed in a quartz-made cleaning column having 19 mm inside diameter and 400 mm length. Each of the Zr-alloys as the cleaning agent was tested in the same manner as in Example 7 to determine the temperature attaining 90% decomposition efficiency, cleaning capability and nitrogen oxide concentration. The results are given in Table 10.

COMPARATIVE EXAMPLES 13 TO 20

The procedure in Example 56 was repeated to carry out cleaning experiment except that there was used as the cleaning agent, V, Mo, Ti, Cr, W, Ta, Nb or Sn (1 to 2 mm in granule size) procured from the market. The results are given in Table 9 and Table 10, but the cleaning capability of Sn granule was not measured because of its failure to achieve 90% decomposition efficiency.

TABLE 9-1

| | Alloy composition (wt %) | | | Lower limit of temperature (°C.) attaining ≧90% decomposition efficiency |
|---|---|---|---|---|
| | Zr | other metal | | |
| Example 56 | 40 | V | 60 | 235 |
| Example 57 | 50 | V | 50 | 205 |
| Example 58 | 70 | V | 30 | 170 |
| Example 59 | 90 | V | 10 | 175 |
| Example 60 | 40 | Mo | 60 | 250 |
| Example 61 | 50 | Mo | 50 | 190 |
| Example 62 | 70 | Mo | 30 | 180 |
| Example 63 | 90 | Mo | 10 | 180 |
| Example 64 | 40 | Ti | 60 | 205 |
| Example 65 | 50 | Ti | 50 | 195 |
| Example 66 | 70 | Ti | 30 | 165 |
| Example 67 | 90 | Ti | 10 | 170 |
| Example 68 | 40 | Cr | 60 | 230 |
| Example 69 | 50 | Cr | 50 | 235 |
| Example 70 | 70 | Cr | 30 | 200 |
| Example 71 | 90 | Cr | 10 | 205 |
| Example 72 | 40 | W | 60 | 195 |
| Example 73 | 50 | W | 50 | 185 |
| Example 74 | 70 | W | 30 | 180 |
| Example 75 | 90 | W | 10 | 185 |
| Example 76 | 40 | Ta | 60 | 185 |
| Example 77 | 50 | Ta | 50 | 180 |
| Example 78 | 70 | Ta | 30 | 175 |
| Example 79 | 90 | Ta | 10 | 190 |
| Example 80 | 40 | Nb | 60 | 225 |

TABLE 9-2

| | Alloy composition (wt %) | | | Lower limit of temperature (°C.) attaining ≧90% decomposition efficiency |
|---|---|---|---|---|
| | Zr | other metal | | |
| Example 81 | 50 | Nb | 50 | 195 |
| Example 82 | 70 | Nb | 30 | 175 |
| Example 83 | 90 | Nb | 10 | 185 |
| Example 84 | 50 | Sn | 50 | 200 |
| Example 85 | 70 | Sn | 30 | 195 |
| Example 86 | 90 | Sn | 10 | 200 |
| Example 87 | 70 | V 15 | Ti 15 | 160 |
| Example 88 | 90 | V 5 | Mo 5 | 175 |
| Comparative Example 13 | 0 | V | 100 | 415 |
| Comparative Example 14 | 0 | Mo | 100 | 395 |
| Comparative Example 15 | 0 | Ti | 100 | 285 |
| Comparative Example 16 | 0 | Cr | 100 | 435 |
| Comparative Example 17 | 0 | W | 100 | 450 |
| Comparative Example 18 | 0 | Ta | 100 | 425 |
| Comparative Example 19 | 0 | Nb | 100 | 430 |
| Comparative Example 20 | 0 | Sn | 100 | — |

TABLE 10-1

| | Cleaning temperature (°C.) | Cleaning capability (L/L) | Nitrogen oxide |
|---|---|---|---|
| Example 56 | 250 | >100 | ND |
| Example 57 | 220 | >100 | ND |
| Example 58 | 180 | >100 | ND |
| Example 59 | 180 | >100 | ND |
| Example 60 | 280 | >100 | ND |
| Example 61 | 200 | >100 | ND |
| Example 62 | 190 | >100 | ND |
| Example 63 | 190 | >100 | ND |
| Example 64 | 220 | >100 | ND |
| Example 65 | 200 | >100 | ND |
| Example 66 | 180 | >100 | ND |
| Example 67 | 180 | >100 | ND |
| Example 68 | 250 | >100 | ND |
| Example 69 | 250 | >100 | ND |
| Example 70 | 230 | >100 | ND |
| Example 71 | 230 | >100 | ND |
| Example 72 | 220 | >100 | ND |
| Example 73 | 200 | >100 | ND |
| Example 74 | 190 | >100 | ND |
| Example 75 | 190 | >100 | ND |
| Example 76 | 210 | >100 | ND |

TABLE 10-1-continued

|  | Cleaning temperature (°C.) | Cleaning capability (L/L) | Nitrogen oxide |
|---|---|---|---|
| Example 77 | 200 | >100 | ND |
| Example 78 | 200 | >100 | ND |
| Example 79 | 200 | >100 | ND |
| Example 80 | 250 | >100 | ND |

TABLE 10-2

|  | Cleaning temperature (°C.) | Cleaning capability (L/L) | Nitrogen oxide |
|---|---|---|---|
| Example 81 | 210 | >100 | ND |
| Example 82 | 190 | >100 | ND |
| Example 83 | 190 | >100 | ND |
| Example 84 | 220 | >100 | ND |
| Example 85 | 220 | >100 | ND |
| Example 86 | 220 | >100 | ND |
| Example 87 | 180 | >100 | ND |
| Example 88 | 190 | >100 | ND |
| Comparative Example 13 | 450 | 23 | ND |
| Comparative Example 14 | 450 | 28 | ND |
| Comparative Example 15 | 300 | 41 | ND |
| Comparative Example 16 | 450 | 10 | ND |
| Comparative Example 17 | 470 | 21 | ND |
| Comparative Example 18 | 450 | 22 | ND |
| Comparative Example 19 | 450 | 34 | ND |
| Comparative Example 20 | — | — | ND |

What is claimed is:

1. A process for cleaning a gas containing a nitrogen fluoride which comprises contacting said gas under heating at a temperature of 150° to 300° C. with a cleaning agent comprising a zirconium alloy to remove said nitrogen fluoride.

2. The process according to claim 1 wherein the zirconium alloy is an alloy of zirconium and at least one metallic element selected from the group consisting of iron, copper, nickel, aluminum, magnesium, calcium, zinc, lanthanum, cerium, vanadium, molybdenum, titanium, chromium, tungsten, tantalum, cadmium, yttrium, niobium and tin.

3. The process according to claim 2 wherein the zirconium alloy is an alloy of zirconium and at least one metallic element selected from the group consisting of iron, copper, nickel, aluminum, magnesium, calcium, zinc, lanthanum and cerium.

4. The process according to claim 1 wherein the content of zirconium in said zirconium alloy is at least 50% by weight.

5. The process according to claim 1 wherein the nitrogen fluoride comprises nitrogen trifluoride or comprises nitrogen trifluoride and at least one number selected from the group consisting of dinitrogen tetrafluoride, dinitrogen difluoride and dinitrogen hexafluoride.

6. The process according to claim 1 wherein the content of zirconium in said zirconium alloy is at least 60% by weight and the gas is contacted with the cleaning agent at a temperature of 170° to 250° C.

7. The process according to claim 1 wherein the content of zirconium in said zirconium alloy is at least 60% by weight.

8. The process according to claim 1 wherein the cleaning agent is contained in a column and the gas flows through the column at a velocity of 20 cm/sec or lower.

9. The process according to claim 1 wherein the cleaning agent is contained in a column and the gas flows through the column at a velocity of 5 cm/sec or less.

* * * * *